United States Patent [19]
Boyd

[11] 3,773,349
[45] Nov. 20, 1973

[54] VEHICLE SUSPENSION CONTROL KIT
[76] Inventor: Dewey D. Boyd, 200 Montrose Dr., Folsom, Calif. 95630
[22] Filed: July 28, 1972
[21] Appl. No.: 276,075

[52] U.S. Cl. .............................. 280/124 B, 267/66
[51] Int. Cl. ............................................. B60g 7/00
[58] Field of Search .................... 267/66; 280/124 B

[56] References Cited
UNITED STATES PATENTS
3,430,978  3/1969  Fortier ........................... 280/124 B
2,159,203  5/1939  Chayne ............................... 267/66

*Primary Examiner*—Philip Goodman
*Attorney*—Vern Schooley

[57] ABSTRACT

A vehicle suspension control kit for installation on a vehicle of the type including a transversely extending rear torsion bar tube having flex plates extending rearwardly from the opposite ends thereof to connect on their respective rear extremities with the respective transverse outer extremities of an articulated rear axle. The kit includes a pair of braces for connection on their front extremities with the opposite extremities of the torsion bar tube at points located inwardly from the ends thereof and for projecting outwardly and rearwardly to engage such flex plates adjacent the rear axle. Such braces are of sufficient length to cooperate with the flex plates and axle to limit downward travel of the respective outer extremities of said axle. Clamp means is provided for securing the front extremities of the braces to the torsion bar tube and bracket means is provided for anchoring the rear extremities of such braces to the flex plates adjacent the rear axle. Articulation means is interposed between the clamp means and braces to accommodate articulation of such braces relative to the torsion bar tube. Thus, the kit may be installed on such vehicle by clamping the front extremities of the braces to the torsion bar and anchoring the rear extremities thereof to the rear extremities of the flex plates and when the vehicle negotiates a corner, the brace on the outside relative to such corner will cooperate with the rear axle to limit the tendency of the outside rear wheel to tuck under such vehicle.

6 Claims, 4 Drawing Figures

PATENTED NOV 20 1973 3,773,349

VEHICLE SUSPENSION CONTROL KIT

BACKGROUND OF THE INVENTION

1. Field of the Invention:

The present invention relates to a kit for installation on a vehicle having an articulated rear axle to limit articulation of such axle upon cornering of the vehicle to thereby limit tendency of the outside rear wheel to tuck in underneath such vehicle.

2. Description of the Prior Art:

Certain vehicles having articulated rear axles exhibit serious safety hazards upon cornering since the outside rear wheel tends to tuck under the vehicle thereby resulting in the vehicle body leaning over approximately 15° to 18° and presenting difficulty in controlling the vehicle as well as discomfort to passengers riding therein. This characteristic is particularly apparent in Volkswagen models prior to 1969. Applicant is unaware of any suspension control kit for convenient and rapid installation on vehicles of this type to effectively limit the amount of articulation of the rear axle during cornering of the vehicle.

SUMMARY OF THE INVENTION

The vehicle suspension control kit of present invention is characterized by a pair of braces that are conveniently clamped at their forward extremities to the torsion bar tube at points inboard of the outer extremities thereof and which angle rearwardly and outwardly to engage respective flex plates that extend rearwardly from the outer extremities of such torsion bar tube to connect at their rear extremities with the outer extremities of the rear axle. The braces provide for a limited amount of articulation but are of a sufficient length to cooperate with the flex plates and axle to limit downward travel of the outer extremities of the rear axle relative to such torsion bar to thereby limit the tendency of the rear outside wheel of the vehicle to tuck under when such vehicle negotiates a corner to thus add stability to the operation of such vehicle.

The objects and advantages of the present invention will become apparent from a consideration of the following detailed description when taken in conjunction with the accompanying drawing.

DESCRIPTION OF THE PREFERRED EMBODIMENT

Figure 1:
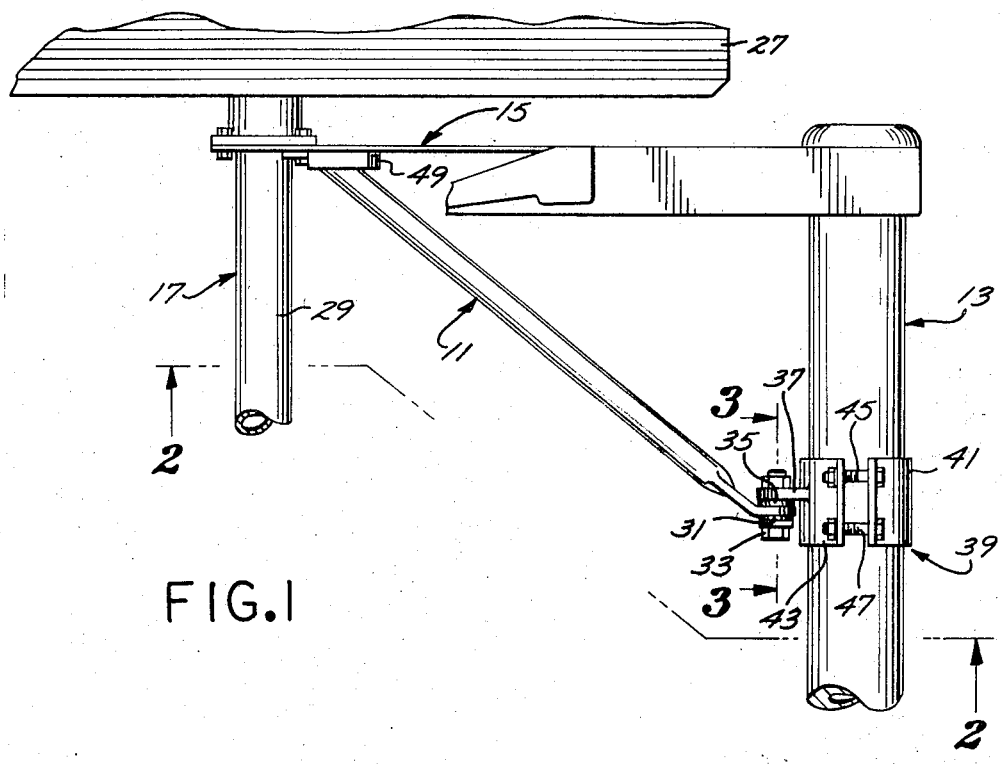
FIG. 1 is a top plan view of the rear torsion bar and axle of a vehicle having the vehicle suspension control kit of present invention installed thereon.

Referring to FIGS. 1 and 5, the vehicle suspension control kit of present invention includes, generally, a pair of braces 11 and 11' which are clamped at their front extremities to a torsion bar tube 13 at points spaced inwardly from the respective opposite ends thereof. Such bars 11 and 11' angle outwardly and rearwardly to be anchored at their respective rear extremities to respective flex plates 15 and 15' which connect with the outer extremities of a centrally articulated rear axle 17. The braces 11 and 11' are of such a length that they cooperate with the respective flex plates 15 and axle 17 to limit relative upward and downward rotation of the outer extremities of suxh axle 17 with respect to the torque bar tube 13 to limit downward movement beyond the radial axis 19 shown in FIG. 2.

Figure 2:
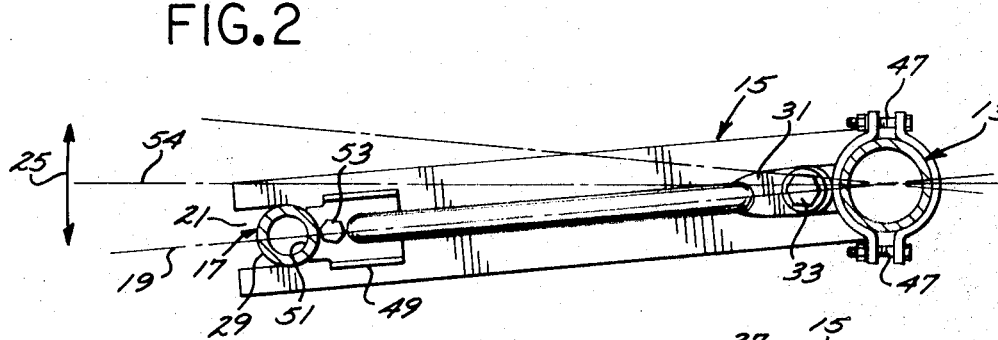
FIG. 2 is a vertical sectional view taken along the line 2—2 of FIG. 1.
Figure 4:
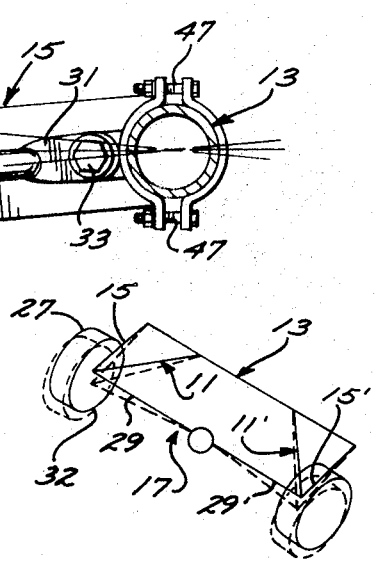
FIG. 4 is a diagramatic view of the vehicle suspension control kit shown in FIG. 1.

Referring to FIG. 4, certain vehicles, such as the pre-1968 Volkswagen, include rigid transverse torsion bar tubes 13 housing torsion bars which have flex plates 15 secured to the opposite ends thereof, such plates projecting rearwardly to be coupled at their rear extremities with the respective opposite ends of the articulated axles 17 by means of rearwardly opening slots 21 received over such axles (FIG. 2). The axles 17 are constructed of two halves 29 and 29' pivoted about a universal joint 30. Thus, without the support provided by the control braces 11 and 11', the only resistance to downward movement of the outer extremities of the articulated axle 17 as the vehicle negotiates a corner is the torsional resistance provided by the flex plates 15. Obviously, these relatively thin plates 15 are relatively ineffective to resist up and down rotation of the opposite sides of the axle 17 relative to the torsion bar tube 13 thus leaving the outer ends of such axle relatively free to pivot upwardly and downwardly about the torsion bar tube 13 as shown by the directional arrow 25 in FIG. 2.

Consequently, when the vehicle rounds a right-hand corner, the centrifugal force of the vehicle pitching outwardly to the left causes such vehicle to tend to be thrown upwardly and outwardly about the left-hand rear wheel 27 (FIG. 4), thus tending to raise the interior extremity of the left-hand half 29 of the axle 17 upwardly and outwardly about the contact point 32 of the wheel 27 with the ground and tending to tuck the bottom of such wheel inwardly with respect to the vehicle body. Such pitching action of the vehicle tends to raise the inside of such vehicle off the ground thus causing the vehicle to lean as much as 15° to 18° with respect to the horizontal thereby creating a dangerously unstable condition and inflicting discomfort on the passengers riding therein.

For convenience, this description will be directed to the brace 11 for the left side of the vehicle, it being realized that a similar brace 11' and associated primed elements will be installed on the right-hand side. The vehicle suspension control kit shown in FIG. 1 for the left-hand side of the vehicle includes a tubular brace 11 which angles inwardly and forwardly and is flattened at its forward extremity and bent to form a mounting tab 31 projecting forwardly at an angle of 130° to the body of the brace and having a transverse bore therein for receipt of a nut and bolt assembly 33. The mounting tab 31 has a resilient rubber grommet 35 received in the bore thereof for receipt of the nut and bolt assembly 33. Such tab 31 is mounted from a rearwardly projecting lug 37 welded to the rear side of a clamp generally designated 39. The clamp 39 is formed by two half rings 41 and 43 which are connected together on their opposite sides by means of mounting bolts 45 and 47.

The rear extremity of the tubular brace 11 is cut on an angle and has a mounting bracket in the form of a C-channel defining a pad 49 welded thereto, such channel projecting at approximately 40° to the longitudinal axis of the brace 11. Referring to FIG. 2, the channel bracket 49 is formed on its rear extremity with an arcuate cutout 51 for abutting against the forward side of the axle 29. Conventionally, the rear extremity of the frame plate 15 has a pre-existing nut and bolt assembly 53 projecting therethrough. Conveniently, such nut and bolt assembly 53 is removed and inserted through a bore in the channel bracket 49 to secure such channel bracket firmly in position against the front side of the axle 29.

In operation the vehicle suspension control kit of present invention is marketed with respective pairs of the braces 11 and 11' and associated anchoring brackets 49 and clamps 39 packaged in one kit. The kit is installed on the left side of the vehicle by extending the clamp 39 (FIG. 1) around the torsion bar tube 13 and inserting the bolts 45 and 47 through the opposite halves of the half rings 41 and 43 and tightening them sufficiently to maintain such clamp loosely in position. Then, with the weight of the vehicle still on the axle 17 to maintain the relative positioning between the torsion bar tube 13 and outer extremity, the nut and bolt assembly 53 is removed from the flex plate 15 and the brace 11 shifted into position to align the bore in the channel bracket 49 with the corresponding bore in the flex plate 15 and the bolt 53 then reinserted. The bracket nut and bolt asssembly 53 is then tightened and the clamp nut and bolt assemblies 45 and 47 tightened to secure the clamp 39 firmly in position. The same procedure is then repeated for the right-hand side of the vehicle for installation of the brace 11'.

Figure 3:
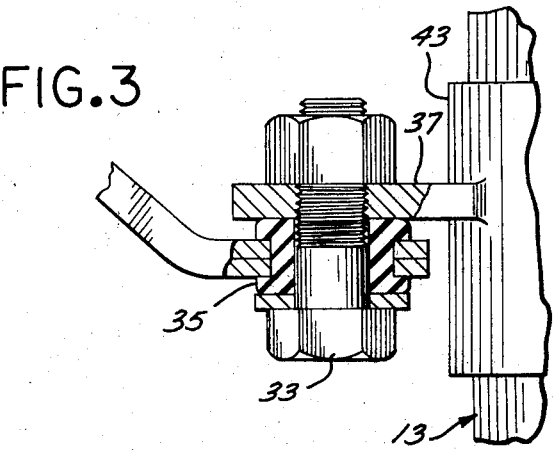
FIG. 3 is a vertical sectional view, in enlarged scale, taken along the line 3—3 of FIG. 1.

Thereafter, when the vehicle is operated and is called on to negotiate a right-hand turn, the weight of such vehicle will be thrown centrifugally outwardly to the left thereby tending to increase the camber of the wheel 27 thus tending to pivot the center of the axle 17 upwardly about the point 32 of engagement of such wheel 27 with the ground thereby tending to tuck such wheel 27 under the vehicle. Such tendency of the wheel 27 to tuck under the vehicle can be thought of as having the result depicted in FIG. 4 wherein the broken line configuration shows the outer extremity of the axle half 29 as being lowered with respect to the inner extremity thereof. As the left wheel 27 lowers with respect to the universal joint 30 and torsion bar tube 13, the flex plate 15 will flex slightly to accommodate such lowering of the wheel 27 and the rear extremity of the brace 11 will likewise tend to pivot downwardly and also inwardly, such double pivoting being permitted by the resilient grommet 35 (FIGS. 1 and 3). Thus, the axle half 29 can be thought of as rotating about the universal joint 30 (FIG. 4) while the flex plate 15 and control bar 11 are thought of as rotating about their forward extremities. As the outer extremity of the axle half 29 rotates downwardly with respect to the universal joint 30, it will tend to draw the rear extremity of the flex plate 15 inwardly but such tendency is resisted by means of the control bar 11, thus restricting relative downward movement of the axle 29 with respect to the torsion bar tube to the lowermost radial axis 19 shown in FIG. 2. Consequently, the wheel 27 is limited against further tucking under thereby lending stability to the vehicle and enhancing the safety of operation thereof.

From the foregoing it will be apparent that the vehicle suspension control kit of present invention provides an economic and convenient means for rendering an otherwise unstable and unsafe vehicle relatively stable and safe to operate. The control kit may be conveniently installed by a relatively unskilled workman and will have a long and trouble-free life.

Various modifications and changes may be made with respect to the foregoing detailed description without departing from the spirit of the present invention.

I claim:

1. A vehicle suspension control kit for installation on a vehicle of the type including a transversely extending rear torsion bar tube having flex plates projecting rearwardly from opposite ends thereof to connect on their rear extremities with the adjacent extremities of an articulated rear axle, said kit comprising:

a pair of rigid braces for connection on their one extremities with said torque bar tube at points disposed transversely inwardly from the ends thereof and projecting rearwardly and outwardly therefrom to be connected on their rear extremities with said flex plates adjacent said axle and of lengths sufficient to cooperate with said flex bars and axles to limit downward travel of the outer extremities of said axle relative to said torque bar tube to a predetermined amount;

clamp means secured to the front extremity of said brace and clamping said brace to said tube;

bracket means securing the rear extremities of said respective braces to said flex plates; and articulation means connected with the respective one ends of said braces to afford articulation of said axle relative to said torsion bar tube whereby said kit may be conveniently installed on said vehicle by securing said clamps to said torsion bar tube and anchoring said brackets to said respective frame plates and when said vehicle negotiates a corner, the brace on the outside side of said vehicle will support the outer extremity of said rear axle against movement downwardly and inwardly beyond said predetermined amount to prevent tucking under of the rear outside wheel.

2. A vehicle suspension control kit as set forth in claim 1 wherein:

said clamps include respective first C-shaped clamp portions affixed to said one extremities of said respective braces for engagement over one side of said tube, respective second clamp portions for engagement over the opposite sides of said tube and means for drawing said respective first and second C-shaped clamp portions securely together on said tube.

3. A vehicle suspension control kit as set forth in claim 1 wherein:

said braces are formed on their said one extremities with transverse bores;

said articulation means includes resilient grommets inserted in said respective bores and fastener means extending through said respective bores and grommets and affixed to said respective clamps.

4. A vehicle suspension control kit as set forth in claim 1 wherein:

said braces are in the form of tubular members flattened on said one extremities and formed with respective transverse bores.

5. A vehicle suspension control kit as set forth in claim 1 wherein:

said brackets include respective pads projecting at an angle of substantially 40° to the longitudinal axis of said respective braces and fasteners for fastening said pads to said respective flex plates.

6. A vehicle suspension control kit as set forth in claim 2 wherein:
said braces are formed at their one extremities with transverse bores;
said respective clamps include respective lugs projecting rearwardly from said first C-shaped clamp portions and formed with transverse passages; and
said articulation means includes grommets inserted in said bores and respective fasteners extending therethrough and through said respective passages to secure said braces to said respective clamps.

* * * * *